(12) United States Patent
Wu

(10) Patent No.: US 6,365,226 B1
(45) Date of Patent: Apr. 2, 2002

(54) METHOD OF FORMING A SEALANT RING WITHIN A THROTTLE BODY ASSEMBLY

(75) Inventor: Zili Wu, Saline, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/481,062

(22) Filed: Jan. 11, 2000

(51) Int. Cl.⁷ .................................................. B05D 7/22
(52) U.S. Cl. ....................... 427/239; 427/284; 427/287; 123/337
(58) Field of Search ................................. 427/236, 239, 427/284, 287, 421, 231, 233; 123/337; 118/317, 318

(56) References Cited

U.S. PATENT DOCUMENTS

| | | | |
|---|---|---|---|
| 2,578,918 A | | 12/1951 | Boddy et al. |
| 4,695,482 A | | 9/1987 | Weiswurm |
| 4,831,977 A | * | 5/1989 | Presswood ............... 123/193 P |
| 5,100,699 A | * | 3/1992 | Roeser ........................ 427/256 |
| 5,480,487 A | * | 1/1996 | Figini et al. |
| 5,640,942 A | * | 6/1997 | Hollister ..................... 123/337 |
| 5,763,004 A | | 6/1998 | Hammen |

FOREIGN PATENT DOCUMENTS

| | | |
|---|---|---|
| DE | 40 27 371 | 3/1992 |
| GB | 2131918 | * 6/1984 |
| GB | 2 131 918 | 6/1984 |

* cited by examiner

*Primary Examiner*—Michael Barr
(74) *Attorney, Agent, or Firm*—Larry I. Shelton

(57) ABSTRACT

The present invention relates to a method of forming a sealant ring within a throttle body assembly comprising an essentially cylindrical housing defined by an essentially cylindrical wall and an essentially circular plate pivotally disposed on the wall wherein an essentially annular gap is formed between the plate and the wall. The method comprises depositing an essentially continuous ring of sealant composition around the throttle body assembly. The essentially continuous ring covers the essentially annular gap. The sealant composition is dispensed from a needle applicator which is disposed above the annular gap and which travels in an essentially circular motion around the throttle body. The sealant composition, upon drying, forms an essentially continuous seal covering the gap of the throttle body.

17 Claims, 2 Drawing Sheets

METHOD OF FORMING A SEALANT RING WITHIN A THROTTLE BODY ASSEMBLY

TECHNICAL FIELD

The present invention relates to a method of forming a sealant ring within to a throttle body assembly and, more particularly, to a method of closing a gap within a throttle body assembly.

BACKGROUND OF THE INVENTION

Throttle body assemblies are necessary components of fuel injection and combustion engine systems. The throttle body assembly controls the amount of air that is introduced into the system.

Throttle body assemblies typically comprise an essentially cylindrical housing defined by an essentially cylindrical wall member. An essentially circular plate member is pivotally disposed on the wall member. The plate member is pivotably moveable between a closed position to a fully opened position to regulate the amount of air that is introduced into the fuel system. The plate member, when in its closed position, does not continuously abut the cylindrical wall member. As such, an essentially annular gap is formed between the plate member and the wall member. Over time, during use of the fuel system, a carbon-based sludge seal will form between the plate member and the wall member to close the annular gap. This seal will be formed by the fuel system component byproducts.

If this seal is allowed to form during the use of the fuel system, the amount of air introduced, and thus, the operating conditions of the fuel system, will have varied overtime. Accordingly, it is desirable, and has been industry practice, to form a seal in the throttle body assembly to cover the annular gap during production of the throttle body assemblies to provide a throttle body assembly which can have continuous and stable use.

Currently, a high pressure (i.e., about 500 psi)spray head application method is used to apply sealant composition to a throttle body assembly to form the throttle body assembly seal. The sealant composition delivered from the spray head contains a substantial amount of methyl ethyl ketone (MEK) solvent which is a highly volatile and flammable chemical. Typical sealant compositions comprise a Molybdenum disulfide/MEK solution, such as Molydag® from Acheson, which is further diluted with an additional 10–20 weight percent of MEK.

The spray method atomizes the sealant composition to spray the sealant composition over the entire inner surface of about half of the throttle body assembly. This generates a high level of fume inside the spray station where the spraying of the sealant composition takes place. This fume is highly explosive and causes operation complexity and difficulty. For example, in a case where pallet carrying one or more throttle bodies is jammed, or lodged, inside the spray station, an operator cannot simply open the station and fix the pallet immediately. Instead, the operator has to take the process off-line and fill the spray station with carbon dioxide gas and then call a security guard to monitor the fume level to make sure it is safe to open the station. A small and common problem like this can delay the whole assembly process from anywhere from one-half to one and one-half hours.

The spray method also generates excess pollution. One reason for this is that the spray method applies sealant to an area much larger than the gap size. This unnecessary sealant overuse causes additional pollution. Another reason for the additional pollution is that, as discussed above, the molybdenum disulfide composition, as received, is then diluted with an additional 10–20 weight percent MEK before being sprayed. This is done to prevent the spray head from becoming caulked from the atomization of the MEK. Not only does this dilution with the additional MEK result in an extra step of operation, i.e., mixing, but it also increases the material cost and pollution.

Accordingly, it would be desirable to provide a method of forming a sealant ring within a throttle body assembly to close the gap within the throttle body assembly which overcomes the above-mentioned pollution and safety problem found in the current spray method, as well as reducing the cost of providing a sealant ring in throttle body assemblies.

DISCLOSURE OF INVENTION

Accordingly, it is an object of the present invention to provide a method of forming a sealant ring within a throttle body assembly that uses a sealant composition that has less MEK than the sealant composition used with the conventional spray head application method.

It is a further object of the present invention to provide a method of forming a sealant ring within a throttle body assembly which requires less sealant composition per seal than does the conventional spray head application method.

It is yet another object of the present invention to provide a method of forming a sealant ring within a throttle body assembly which overcomes the safety concerns associated with the conventional spray head application method.

It is still yet another object of the present invention to provide a method of forming a sealant ring within a throttle body assembly which can be brought off and on line in a relatively short time compared to the conventional spray head application method.

It is even still yet another object of the present invention to provide a more economical method of forming a sealant ring within a throttle body assembly.

The above and other objects of the present invention are met by providing a method of forming a sealant ring within a throttle body assembly comprising an essentially cylindrical housing defined by an essentially cylindrical wall and an essentially circular plate pivotally disposed on the wall wherein an essentially annular gap is formed between the plate and the wall. The method comprises depositing an essentially continuous ring of sealant composition around the throttle body assembly. The essentially continuous ring covers the essentially annular gap. The sealant composition is dispensed from a needle applicator which is disposed above the annular gap and which travels from a first location in an essentially circular motion around the throttle body until the needle applicator returns to the first location. The sealant composition, upon drying, forms an essentially continuous seal covering the gap of the throttle body.

The above objects of the present invention are also met by providing a method of forming a sealant ring within a throttle body assembly comprising an essentially cylindrical housing defined by a cylindrical wall, and an essentially circular plate pivotally disposed on the wall, wherein an annular gap is formed between the plate and the wall. The method comprises depositing an essentially continuous ring of sealant on the wall and plate to essentially cover the annular gap. The ring is the cured product of an essentially continuous rising of sealant composition. The essentially continuous ring of sealant composition is formed by depositing sealant composition from a needle applicator which travels in a circular motion from a first location around the throttle body assembly until contacting the first location to form a continuous seal over the annular gap.

BEST MODE FOR CARRYING OUT THE INVENTION

Figure 1:
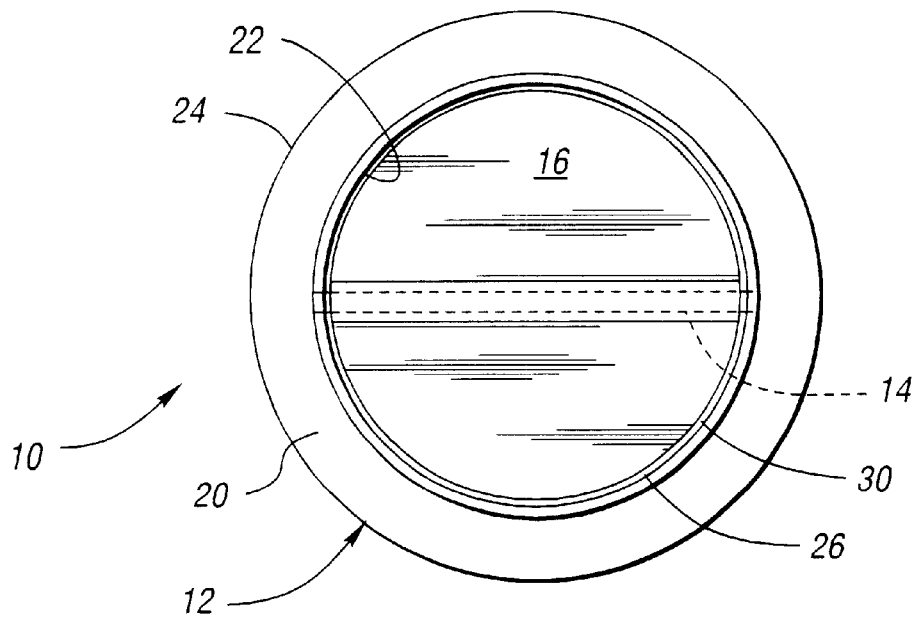
FIG. 1 is a plan view of a throttle body assembly for use with the present invention.

FIG. 1 shows a plan view of an exemplary throttle body assembly 10 for use with a fuel system (not shown). The throttle body assembly 10 regulates the flow of intake air into the fuel system.

The throttle body assembly 10 comprises a throttle body assembly housing 12, a rotatable shaft 14 extending between opposed ends of the throttle body assembly housing, and a throttle body plate 16, pivotably disposed on the shaft within the throttle body assembly housing. The throttle body assembly 10 can be a variety of shape. It is presently contemplated that the throttle body assembly 10 could be cylindrical or elliptical. For exemplary purposes, the present invention will be described with respect to a cylindrical throttle body assembly as shown in the Figures, however, it should be understood that the present invention is not limited to such constructions.

The throttle body assembly housing 12 shown in FIG. 1 comprises an essentially cylindrical wall member 20 defined by an essentially cylindrical inner surface 22 and an essentially cylindrical outer surface 24. As shown in FIG. 1, the shaft 14 extends from the 3:00 o'clock position (90°) of the wall member 20 to the 9:00 o'clock position (270°) of the wall member 20. The throttle body assembly plate member 16 is essentially circular and is defined by an essentially circular surface 26.

An essentially angular gap 30 is formed between the throttle body assembly housing 12 and the throttle body assembly plate member 16. More specifically, the gap 30 is disposed between the inner surface 22 of the essentially cylindrical wall member 20 of the throttle body assembly housing 12 and the circular surface 26 of the throttle body assembly plate member 16. The gap 30 has a width of about 0.5–2 mm.

Figure 2:
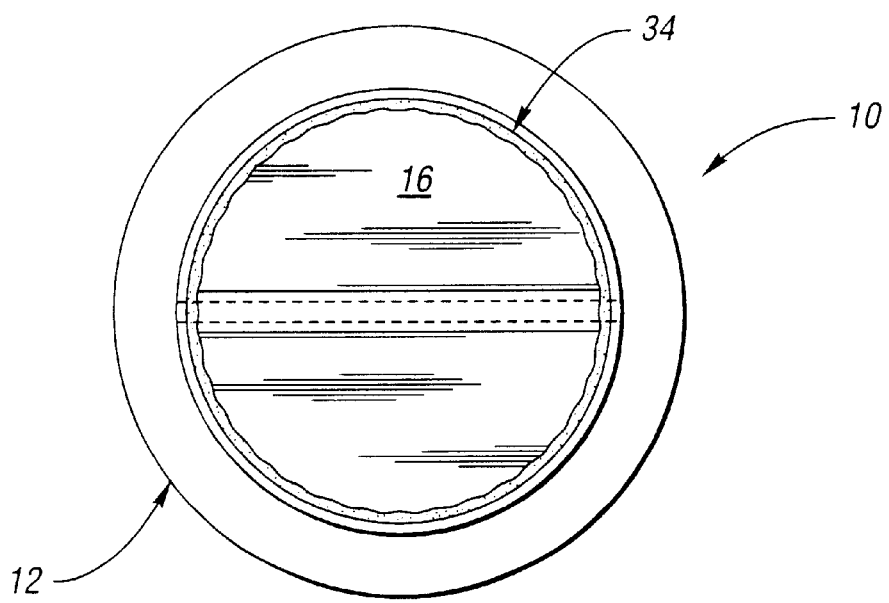
FIG. 2 is a plan view of a throttle body assembly having a sealant ring formed therein in accordance with the present invention.

As shown in FIG. 2, the gap 30 is filled/covered by a sealant ring 34. Sealant ring 34 is the cured product (i.e., the composition after the solvent has evaporated) of a sealing composition usable with the present invention. The sealant compositions useable with the present invention comprised molybdenum disulfide ($MoS_2$) carried in a MEK solvent wherein the MEK solvent comprises no more than about 85 weight percent of the sealant composition.

Preferably, the sealant composition comprises less than about 85 volume percent MEK. More preferably, the sealant composition comprises between about 60 to about 85 volume percent MEK, between about 1 to 10 volume percent molybdenum disulfide, between about 1 to about 15 volume percent xylene, between about 1 to 10 volume percent ethyl alcohol, and between about 1 to 10 volume percent isopropanol.

Even more preferably, the sealant composition comprises between about 70 to 80 volume percent MEK, between about 3 to 10 molybdenumn disulfide, between about 2 to 10 volume percent xylene, between about 3 to 8 volume percent ethyl alcohol, and between about 2 to 6 volume percent isopropanol. Most preferably, the sealant composition comprises between about 75 to 80 volume percent MEX, between about 5 to 10 molybdenum disulfide, between about 6 to 10 volume percent xylene, between about 3 to 8 volume percent ethyl alcohol, and between about 2 to 6 volume percent isopropanol. An example of preferred sealant composition is Molydag® from Acheson, without any further dilution —100% Molydag®.

Figure 3:
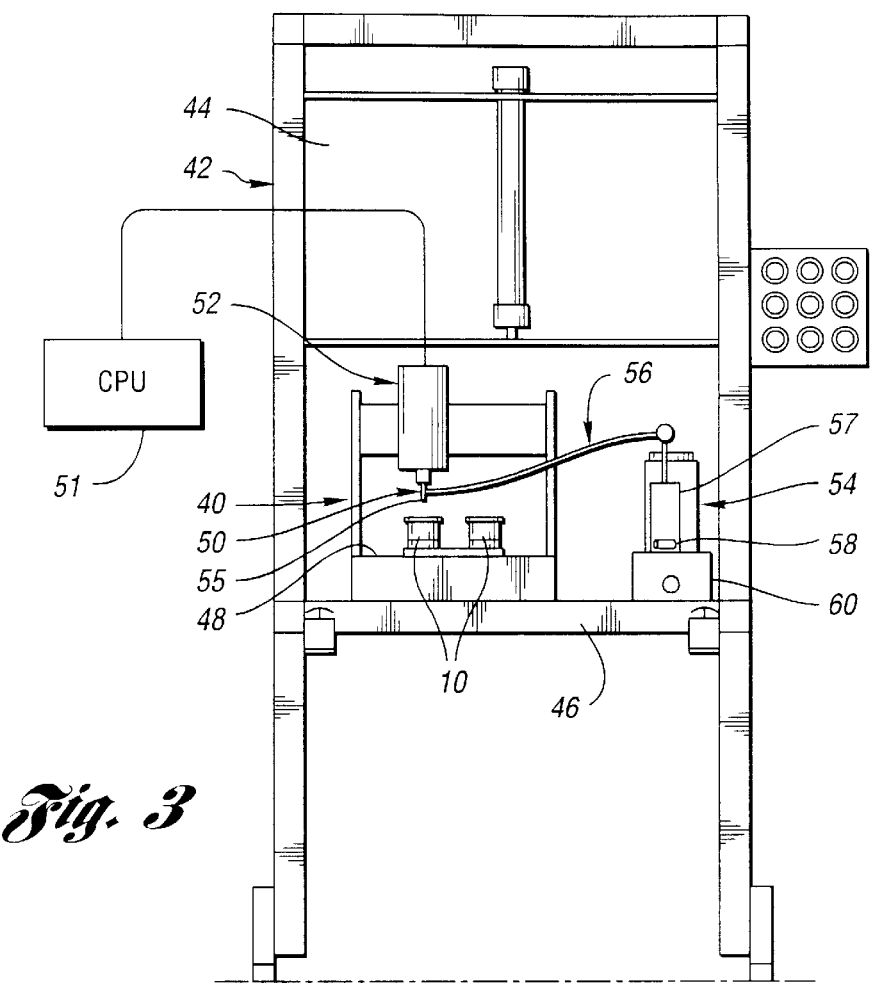
FIG. 3 is a side view of the throttle body assembly seal forming apparatus of the present invention.

Referring to FIG. 3, the method by which the sealant composition is deposited to form the sealant ring 34 is illustrated. A throttle body assembly seal forming apparatus 40 is shown. The apparatus 40 is supported in a reaction hood 42 on a base 46. The hood 42 includes a sliding glass window door 44, shown in FIG. 3 in the opened position, for allowing ingress and egress into the hood 42.

Figure 4:
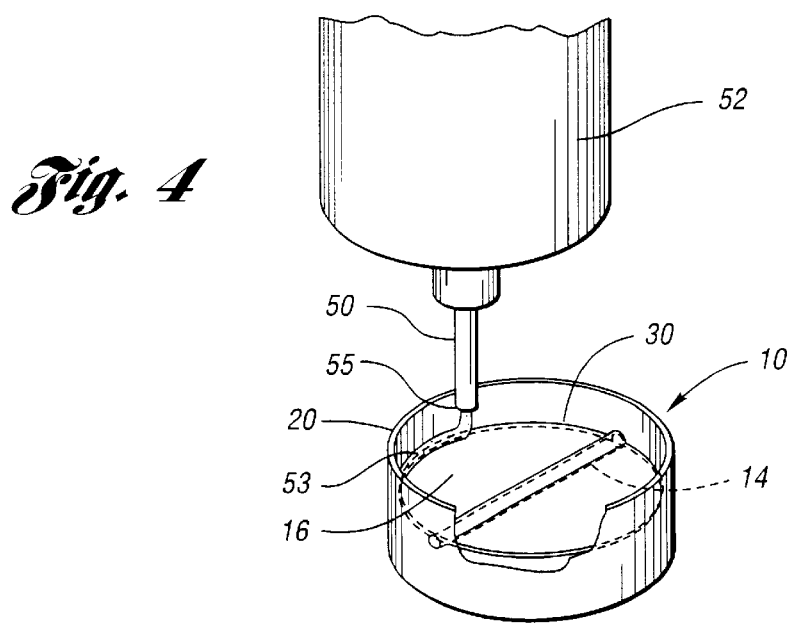
FIG. 4 is an enlarged perspective view of some of the components shown in FIG. 3.

The apparatus 40 comprises a work surface 48 which supports a plurality of the throttle body assemblies 10, (only two are shown in FIG. 3) to have sealant rings 34 provided therein. The apparatus 40 includes a needle applicator 50 supported (carried) by an XYZ robot 52 controlled by a central processing unit (CPU) 53. The XYZ robot 52 is capable of moving the needle applicator 50 in any direction along the X, Y and Z axes. As best shown in FIG. 4, the needle applicator 50 has a small dispensing hole 55 for dispensing a bead 53 of sealant composition to cover the gap 34. The size of the dispensing hole 55 varies with, among other things, the size of the gap to be filled, however, the dispensing hole preferably has a diameter of about 0.01–0.06 inches, and more preferably, about 0.02 inches. Preferably, the beads 53 of sealant composition dispensed from hole 55 are between about 2–15 mm in width, and most preferably between about 5–10 mm in width, and between about 1–15 mm in diameter, and most preferably between about 3–6 mm in diameter. The needle applicator 50 can dispense sealant composition at any desired rate, but preferably dispenses sealant composition in an amount of about 0.025–0.5 grams/second, more preferably about 0.01–0.2 grams/second, at a pressure of about 2–15 psi, more preferably about 3–10 psi.

The sealant composition to be deposited within the throttle body assemblies 10 is stored under pressure in a plastic container 57 which is housed within a metallic, most preferably aluminum, container 54 within the hood 42.

A conduit, i.e., tube 56 extends between the container 57 and the needle applicator 50 for providing fluid communication between the container 54 and the needle applicator 50. A magnetic stirrer 58 is disposed within the container 57 and is operable by a magnetic stirrer controller 60. The magnetic stirrer 58 operates to agitate the sealant composition within the container 56 to maintain the sealant composition at uniform consistency.

To deposit the sealant composition within the throttle body assembly 10 to form the sealant ring 34 which closes the annular gap 30, the XYZ robot 52 is moved in a circular motion about the annular gap 30 while the applicator 50 deposits a bead 53 of the sealant composition in a low pressure (2–15 psi) manner. The needle applicator 50 while moving in a circle about the annular gap 30 deposits the sealant bead to form an annular sealant ring. The sealant composition exits the needle applicator 50, through opening 55 following a path allowing the annular gap 30 and dispenses a sealant bead strip 53 which, when dry, forms an annular sealant ring 34 that extend between the plate member 16 and the housing 12 and thus covers, or closes, the annular gap 30. The gap 30 is typically between about 0.5 to about 1.5 millimeters, the seal 34 is typically larger than the gap 30 and is thus typically between about 0.7 to about 2 millimeters in width.

The needle 50 is disposed about a few millimeters above the annular gap 30 as it moves along an essentially circular path while depositing the sealant. Each pass takes between about eight to ten seconds to complete. A complete pass, or path, for forming the sealant ring 34 comprises at least about 360° and begins at a first location, such as the 12 o'clock position on the wall member 12 and ends when the needle applicator 50 extends around the wall member returning to the 12 o'clock position, depositing drops/beads of sealant composition along the way. That is, it takes the needle applicator 50 about ten seconds to travel 360° to form a complete annular sealant ring 34. The sealant ring 34 is formed upon evaporation of most, if not all, of the MEK solvent. To prevent the dispensing hole 55 of the needle applicator 50 from closing up during inactivity, because of the volatile nature of the MEK, the CPU 53 is programmed to direct the needle applicator 50 to periodically dispense a droplet of sealant composition after a predetermined period of time of inactivity (non-use).

The method of the present invention provides significant environmental and cost savings over the conventional spray head application method. One of the most significant advantages is the use of less sealant per seal than with the prior art method. The sealant ring 34 formed by the method of the present invention is formed from about 0.015 to 0.02 ounces of sealant composition. A comparable seal using the prior art spray method would require between 1.8 and 3 times as much sealant to form the same seal (i.e., about 0.3 to about 0.6 ounces). Also, less methyl ethyl ketone is used for two reasons. First of all, there is less sealant use, thus, less methyl ethyl ketone would be used. Secondly, the sealant composition used with the present invention has less methyl ethyl ketone compositionally than does the sealant used with the prior art method. Also, because the pressures in the prior art process are between about 350 to 550 psi, and the pressure used in the method of the present invention are between about 2–15 psi, there is no atomization of the sealant and thus no build up of methyl ethyl ketone in the hood and thus break downs and off line situations do not require an excessive amount of time to rectify due to the problems associated with high volumes of methyl ethyl ketone in the hood from the high pressure spray operations.

While embodiments of the invention have been illustrated and described, it is not intended that these embodiments illustrate or describe all possible forms of the invention. Rather, the words used in the specification are words of description rather than limitation, and it is understood that various changes may be made without the parting from the spirit and scope of the invention.

What is claimed is:

1. A method of forming a sealant ring within a throttle body assembly comprising an essentially cylindrical housing defined by an essentially cylindrical wall and an essentially circular plate pivotally disposed on the wall wherein an essentially annular gap is formed between the plate and the wall, the method comprising:

depositing an essentially continuous ring of sealant composition comprising molybdenum disulfide and an amount of methyl ethyl ketone of less than 85% of the total weight of the sealant composition around the throttle body assembly, the essentially continuous ring covering the essentially annular gap, the sealant composition being dispensed from a needle applicator at a pressure of between about 2 to about 15 psi which is disposed above the annular gap and which travels from a first location in an essentially circular motion around the throttle body until the needle applicator returns to the first location, the sealant composition, upon drying, forming an essentially continuous seal covering the gap of the throttle body.

2. The method of claim 1 wherein the sealant composition comprises less than about 75 volume percent methyl ethyl ketone and wherein the molybdenum disulfide is present in an amount of between about five and ten volume percent, based on the volume of the sealant composition.

3. The method of claim 1 wherein the sealant composition is continuously stirred prior to being deposited onto the throttle body assembly.

4. The method of claim 3 wherein the sealant composition is disposed within a non-metallic container in fluid communication with the needle applicator, the continuous stirring of the sealant composition being effected by a magnetic stirrer.

5. The method of claim 1 wherein the sealant ring is formed from about 0.015 to 0.02 ounces of sealant composition to make the sealant ring.

6. The method of claim 1 wherein the sealant composition is deposited from the needle applicator at a rate of between about 0.025 to about 0.5 grams per second.

7. The method of claim 1 wherein a central processing unit is provided to control the operation of the movement of the needle applicator and the depositing of the sealant composition from the needle applicator.

8. The method of claim 7 wherein the central processing unit is programmed to dispense a predetermined number of drops of sealant composition at a predetermined time interval during periods of idle use of the needle applicator.

9. The method of claim 1 wherein the needle applicator has a dispensing hole having a diameter of about 0.01–0.06 inches.

10. A method of forming a sealant ring within a throttle body assembly comprising an essentially cylindrical housing defined by a cylindrical wall, and an essentially circular plate pivotally disposed on the wall, wherein an annular gap is formed between the plate and the wall, the method comprising:

depositing an essentially continuous ring of sealant comprising molybdenum disulfide and an amount of methyl ethyl ketone of less than 85% of the total weight of the sealant composition on the wall and plate to essentially cover the annular gap, the ring being the cured product of an essentially continuous ring of sealant composition, the essentially continuous ring of sealant composition being formed by depositing sealant composition from a needle applicator at a pressure of between about 2 to about 15 psi and in a circular motion from a first location around the throttle body assembly until contacting the first location to form an essentially continuous seal over the annular gap.

11. The method of claim 10 wherein the needle applicator has a dispensing hole having a diameter of about 0.01–0.06 inches.

12. The method of claim 10 wherein the sealant composition is continuously stirred prior to being deposited onto the throttle body assembly.

13. The method of claim 12 wherein the sealant composition is disposed within a non-metallic container in fluid communication with the needle applicator, and wherein a magnetic stirrer continuously stirs the sealant composition.

14. The method of claim 12 wherein the sealant ring is formed from about 0.015 to 0.02 ounces of sealant composition to make the sealant ring.

15. The method of claim 10 wherein the sealant composition is deposited from the needle applicator at a rate of between about 0.025 to about 0.5 grams per second.

16. The method of claim 10 wherein a central processing unit is provided to control the operation of the movement of the needle applicator and the depositing of the sealant composition from the needle applicator.

17. A method of forming a sealant ring within a throttle body assembly comprising an essentially cylindrical housing defined by an essentially cylindrical wall and an essentially circular plate pivotally disposed on the wall wherein an essentially annular gap is formed between the plate and the wall, the method comprising:

providing a sealant composition comprising molybdenum disulfide and an amount of methyl ethyl ketone of less than 85% of the total weight of the sealant composition;

providing a needle applicator capable of depositing the provided sealant from a dispensing hole having a diameter of about 0.01–0.06 inches while traveling around the annular gap from a first location in an essentially circular motion around the throttle body until the needle applicator returns to the first location;

depositing an essentially continuous ring of sealant at a pressure of between about 2 to about 15 psi and a rate of about 0.025 to about 0.5 grams per second from the needle applicator above the annular gap for covering the essentially annular gap so that upon drying the sealant forms an essentially continuous seal covering the gap of the throttle body; and controlling the movement of the needle applicator and the depositing of the sealant with a central processing unit, wherein the central processing unit is also programmable to dispense a predetermined number of drops of sealant at a predetermined time interval during periods of idle use of the needle applicator.

* * * * *